United States Patent [19]

Meginnis et al.

[11] 4,269,032

[45] May 26, 1981

[54] WAFFLE PATTERN POROUS MATERIAL

[75] Inventors: George B. Meginnis; John A. Spees, both of Indianapolis, Ind.

[73] Assignee: General Motors Corporation, Detroit, Mich.

[21] Appl. No.: 48,131

[22] Filed: Jun. 13, 1979

[51] Int. Cl.[3] .................. F02C 7/18

[52] U.S. Cl. .................. 60/754; 416/97 A; 428/138

[58] Field of Search .................. 428/137, 138; 60/754, 60/755, 756, 757; 416/97 A

[56] References Cited

U.S. PATENT DOCUMENTS

| | | | |
|---|---|---|---|
| 3,349,558 | 10/1967 | Smith | 60/754 |
| 3,557,553 | 1/1971 | Schmitz | 60/754 |
| 3,584,972 | 6/1971 | Bratkovich et al. | 416/97 A |
| 3,620,643 | 11/1971 | Jones | 416/97 A |
| 3,623,711 | 11/1971 | Thorstenson | 60/754 |
| 4,168,348 | 9/1979 | Bhangu et al. | 60/754 |

*Primary Examiner*—Robert E. Garrett

*Attorney, Agent, or Firm*—J. C. Evans

[57] ABSTRACT

A transpiration air cooled combustor assembly for a gas turbine engine includes an annular liner of laminated metal with an inner sheet and an outer sheet having a plurality of mechanically formed holes therein on either side of a mechanically pressed waffle patterned core sheet with offset depressings and dimples on either face thereof; the dimples have raised lands bonded to the inner and outer sheets; small cross passages are drilled in the core sheet so that the margins of the cross passages are located in spaced relationship to the land surfaces thereby to prevent burr formation disruption of the bond joints; the core sheet has a total metal mass equivalent to the orginal metal mass prior to press displacement of metal to form the depressions and dimples therein except for the metal removed by formation of the cross passages which communicate offset depressions on opposite sides of the core sheet to form a tortuous intercommunicating flow path through said annular liner between holes in the inner and outer sheets for flow of coolant therethrough.

3 Claims, 4 Drawing Figures

WAFFLE PATTERN POROUS MATERIAL

This invention relates to improvements in three layer porous laminated material for gas turbine engine combustors and other such devices which are protected from high temperature gas by discharge of a cooling gas through numerous pores distributed over the surface of the combustors or a like high temperature operating device. This mode of cooling is referred to as transpiration cooling.

This invention is particularly adapted to transpiration cooled combustors with laminated porous metal walls of the general sort described in prior patent applications, of common ownership with this application, as follows. U.S. Pat. No. 3,584,972, issued June 15, 1971, to Bratkovich and Meginnis, for LAMINATED POROUS METAL; U.S. Ser. No. 862,859, filed Dec. 21, 1977, by Sweeney and Verdouw, for GAS TURBINE ENGINE COMBUSTOR MOUNTING, and U.S. Ser. No. 887,879, filed Mar. 20, 1978, by Herman and Reider, for POROUS LAMINATED COMBUSTOR STRUCTURE. These turbine engine combustors have laminated walls, the outermost layer of which has pores which are formed in the surface of the layer by a process such as photoetching to provide numerous inlets and outlets for cooling air or other gas between the exterior and interior of the combustor. Combustors or other structures with porous laminated walls to be protected from hot gas by transpiration cooling will be referred to hereafter in this specification as "combustors".

Combustor apparatus for gas turbine engines typically includes a plurality of axially directed sleeve segments connected together by offset air distribution systems to provide wall cooling of the liner segments of a combustor apparatus to prevent excessive flame erosion on the inside surface of combustor walls. Examples of such systems are set forth in U.S. Pat. Nos. 3,064,424, issued Nov. 20, 1962, To Tomlinson; 3,064,425, issued Nov. 20, 1962, to C. F. Hayes; and 3,075,352 issued Jan. 29, 1963, to L. W. Shutts.

While the aforesaid gas turbine engine combustors are suitable for their intended purpose, it is desirable to minimize flow of coolant air required to cool the inner wall of the combustion apparatus against flame erosion. Various proposals have been suggested to make the full wall of the combustor apparatus of porous material to cool the internal wall surface of the combustor apparatus. One such arrangement is set forth in U.S. Pat. No. 3,557,553, issued Jan. 26, 1971, to Schmitz, wherein porous metal fiber is compressed to provide a controlled amount of inlet coolant flow through pores in a mixing skirt and thence into a combustion chamber so as to obtain transpiration cooling of the interior wall of the combustion chamber. Another proposal for providing for a plurality of perforations to produce transpiration cooling effects on the interior wall of a combustion chamber is set forth in U.S. Pat. No. 3,623,711, issued Nov. 30, 1971, to Thorstenson. In both of these arrangements the upstream end of the combustion liner is imperforate to define structural support for the liner apparatus within a gas turbine engine.

In prior arrangements, extensive effort has been directed to chemical etching of the layers of the laminated material as set forth in U.S. Pat. No. 3,584,972, issued June 15, 1971, to Bratkovich and Meginnis for LAMINATED POROUS METAL. In order to maintain a total laminate thickness in the order of 0.060 inches for desirable strength and formability, and to retain maximum cooling, it has been found that chemical etches patterns of the type set forth in the aforesaid Bratkovich et al patent may produce excessive reduction of the metal sections because of overetching therein.

To avoid excessive stress and to maintain sufficient laminate strength, attention has been given to the formation of porous laminated sheets to determine if improved low cost formability can be obtained without adversely effecting the strength of the laminate.

In original proposals for fabrication of porous laminated material, chemical etching metal machining proposals included "hole only" sheets at the inside and outside of a three layer laminate structure which included a "groove only" sheet at the core of the laminated arrangement. In the past, photoetching processes were used for such arrangements because of excellent accuracy in resultant porous patterns in the material and, further, because such photoetching processes enabled a substantial degree of flexibility in determining the eventual pattern selection of the holes and/or grooves in the resultant arrangement. Furthermore, photoetching processes included an absence of burrs at the holes which might otherwise interfere with formation of solid diffusion bond joints between juxtaposed land portions of the layers of material making up the porous laminated wall structure.

It has been found that such photoetched material is especially suited for use in porous laminated walls for turbine blades and vanes. However, at the present time such porous laminated walls are utilized in the formation of liners for combustors which require thicker sheets, larger areas of sheet material to make up the wall section and patterns of holes and grooves therein which do not require the precise dimensional configuration of pores used in transpiration cooled compartments such as turbine blades for gas turbine engine structures.

Furthermore, it has been found that porous laminated wall sections for use in gas turbine engine combustors have less pattern variation for transpiration cooling thereof and as a result it has been found that alternative fabrication methods can be used to form larger sheets which are more economical than photoetching.

Accordingly, an object of the present invention is to provide an economical, high strength three layer laminated sheet for the formation of a transpiration cooled liner in a combustor apparatus of a gas turbine engine assembly including a waffle patterned pressed metal core sheet having opposed depressions formed on opposite faces thereof and offset raised lands thereon bonded to "holes only" inner and outer sheets having holes formed therein by mechanical piercing and wherein reduced diameter intermediate holes are drilled through the waffle patterned core sheet to serve as a cross passage for coolant air flow from a first predetermined hole pattern of one inner or outer sheet in a tortuous flow path around dimples in the waffle patterned core sheet to offset other ones of a plurality of hole patterns in the other of the sheets and wherein the core sheet has a total mass reduced only by the formation of the small diameter hole drilled therethrough without excessive removal of metal stock at hole margins of the core sheet as produced by photoetching thereby to retain desirable strength properties in the laminated material and the drilled holes have burr regions thereon displaced from the bond surface between the raised lands and adjacent segments of the "holes only" inner and outer sheets to facilitate bonding by molten phase bonding accelerators and/or solid state bonding methods.

Another object of the present invention is to provide an improved air cooled combustor for use in gas turbine engines including a porous laminated liner throughout the length thereof having a three layer construction including inner and outer sheets with first and second plurality of offset pierced hole patterns therein and an interposed waffle patterned pressed metal core sheet with drilled cross passages therein for communicating offset pierced holes of the inner and outer sheets with offset depressions formed in the waffle patterned core sheet and the cross passages being drilled through a segment of the core sheet which is located in displaced relationship to flat land bond surfaces on the dimples of the core sheet to facilitate bonding to the inner and outer sheets by use of molten phase bond accelerator material and wherein the pressed metal waffle patterned core sheet is formed from a flat metal stock by displacement of metal to retain the full mass of the core sheet except for removal of the cross passage material therefrom so as to retain desirable strength characteristics of the porous laminated material during exposure to high temperature operating conditions.

Further objects and advantages of the present invention will be apparent from the following description, reference being had to the accompanying drawings wherein a preferred embodiment of the present invention is clearly shown.

Figures 1, 2, 3, 4:
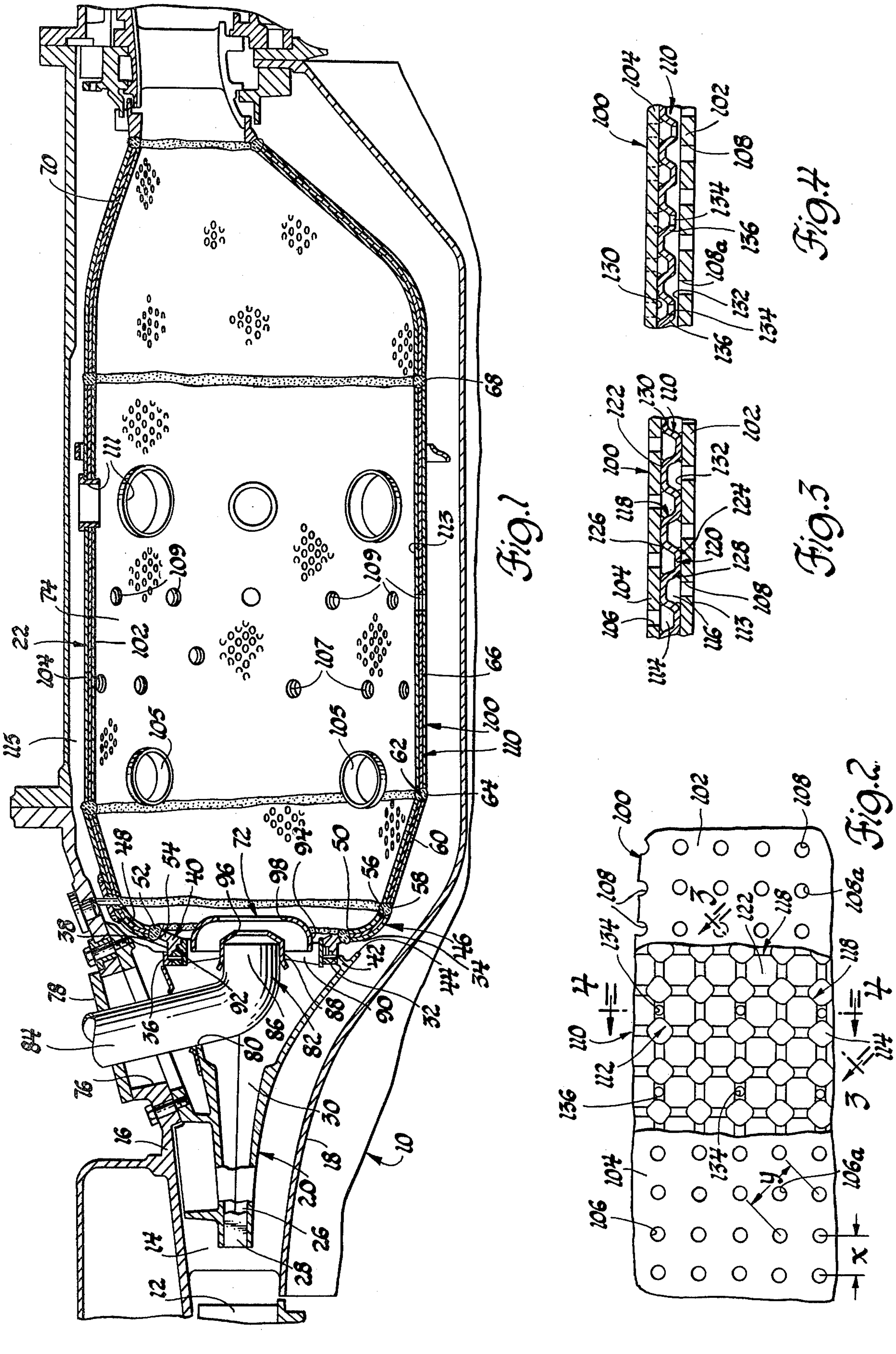
FIG. 1 is a longitudinal sectional view of a combustor apparatus in accordance with the present invention.
FIG. 2 is a fragmentary enlarged, broken away elevational view of an unrolled segment of the wall of the combustor apparatus of FIG. 1.
FIG. 3 is a sectional view taken along line 3—3 of FIG. 2.
FIG. 4 is a fragmentary sectional view taken along the line 4—4 of FIG. 2.

Referring now to the drawings, FIG. 1 shows a portion of a gas turbine engine 10 having a compressor 12 of the axial flow type in communication with a discharge duct 14 defined by a first radially outer annular engine wall 16 and a second radially inwardly located annular engine wall 18.

An inlet diffuser member 20 is located downwstream of the discharge duct 14 to distribute compressed air from the compressor 12 to a combustor assembly 22 including a porous laminated three layer construction in accordance with the present invention.

The member 20 has a low profile inlet 26 located approximately at the midpoint of the duct 14. A flow divider plate 28 is located in the inlet 26 to uniformly distribute compressed air flow into a radially divergent flow passage 30 in member 20 which is contoured to define a generally circular outlet 32 at the inlet end 34 of the combustor assembly 22.

The diffuser member 20 includes a downstream shoulder 36 that is supportingly received by the outer annular surface 38 of a rigid support ring 40. A support shoulder 42 on the member 20 is in engagement with the ring 40 to center an upstream extending annular lip 44 at the outlet of the inlet diffuser member 20 and to locate it in a radially spaced relationship with the ring 40 to direct coolant flow against the upstream end of a dome 46 of the combustor assembly 22.

The dome 46, more particularly, is made up of a first contoured ring 48 of porous laminated material that includes a radially inwardly located edge portion 50 thereon secured by an annular weld 52 to a radially outwardly directed flange 54 on the support ring 40. Downstream edge 56 of ring 48 is connected by an annular weld 58 to a radially outwardly convergent contoured ring portion 60 of dome 46 also of porous laminated material. The contoured ring 60 has its downstream edge 62 connected by an annular weld 64 to a porous laminated sleeve 66 which is connected by means of an annular weld 68 to a flow transition member 70 of porous laminated material.

Ring 40 also forms a housing for an air blast fuel atomizer assembly 72 that directs air and fuel into a combustion chamber 74 within the porous laminated sleeve 66.

In the illustrated arrangement, the wall 16 includes an access opening 76 and a mounting pad 78 that is in alignment with an opening 80 in the upper part of the inlet diffuser member 20 to provide access for a fuel nozzle 82 of assembly 72. Nozzle 82 includes a generally radially outwardly directed stem 84 thereon and a nose portion 86 that is supported by an inner ring 88 of the assembly 72.

The nozzle 82 has a plurality of inclined vanes 90 directed radially between the inner ring 88 and an outer shroud ring 92. The vanes 90 are angled to the longitudinal axis of the combustor assembly 22 to produce a swirling action in air flow from the flow passage 30 into the combustion chamber 74. An intermediate annular guide ring 94 directs the swirled air radially inwardly for mixing with fuel from an outlet orifice in the nozzle 82 to thoroughly mix air/fuel to improve combustion within the chamber 74 during gas turbine engine operation. Lips 96 and 98 are formed inboard of rngs 88, 94, respectively, to atomize fuel spray that mixes with air blast from the vanes 90.

In accordance with the present invention, the liner 100 of the combustor assembly 22 is defined by the contoured rings 48, 60 and sleeve 66 to produce a transpiration cooled wall construction that minimizes the requirement for wall cooling air while adequately cooling the inside surface of the combustor assembly 22 exposed to the flame front within the combustion chamber 74.

Each segment of porous laminated liner 100 as show in FIGS. 2–4 is made up of a pair of inner and outer porous layers or sheets 102, 104. The pores have a diameter such that the liner 100 has a discharge coefficient of 0.006 per square inch of liner wall area. Representative air distribution into combustor assembly 22 includes 11.5% of total air flow via assembly 72. A front row of primary air holes 105 receives 14.5% of total air flow; a pair of rows of intermediate air holes 107, 109 receive 8% and 5.6%, respectively, of the total combustor air flow. Dilution air holes 111 in sleeve 66 receive 35.8% of the total combustor air flow.

The remainder of the total combustor air flow is through the liner wall pores. The aforesaid figures are representative of flow distributions in combustors using the invention. Cooling of the inner surface 113 of liner 100 is in part due to transpiration cooling as produced by flow of compressed air from a duct 115 surrounding combustor assembly 22 to a point radially inwardly of the liner 100 through a plurality of pores and grooves therein formed in accordance with the present invention.

In fabrication of combustor assemblies such as combustor assembly 22 disclosed above, it is desirable to have a specifically configured pattern of pores and grooves in the layered material making up the laminate to maintain the strength of the wall section as well as to reduce manufacturing costs thereof.

Accordingly, by practicing the present invention a typical porous metal stack is used in combustor apparatus wherein the outer porous layer or sheet 104 has a plurality of holes 106 which are formed in a pattern of holes located on centers marked by dimension "X" of 0.096 inch centers as a square pattern across the sheet 104. Alternatively, the sheets might have a diagonal dimension "Y" of spacing of 0.136 inches which constitutes the previous hole pattern spacing with a center one of the holes 106a omitted throughout the pattern.

directed through web segments 136 that join the dimples 118, 120. The location of the drill cross passages 134 in the webs 136 are such that any drill burr formed on cross passages 134 are spaced from the bond regions formed by the braze layers 126, 128 on each of the land segments 122, 124 to facilitate the bonding process.

Representative types of high temperature alloys which are suitable for use in forming porous material having the configuration set forth in the embodiments in FIGS. 3 through 4 are set forth in the tabulation below. Such materials are resistant to extremely high temperature operation in environments found in gas turbine engines.

| Name | AMS Spec. | Cr | Co | Mo | Ti | W | Al | Fe | Ni |
|---|---|---|---|---|---|---|---|---|---|
| Hastelloy X | 5,536 | 22 | 1.5 | 9.0 | ... | 0.6 | | 18.5 | Base |
| Waspaloy | 5,544 | 19.5 | 13.5 | 4.3 | 3.0 | ... | 1.4 | .... | " |
| Rene | 5,545 | 19 | 11 | 10 | 3.0 | ... | 1.5 | 5.0 | " |
| Udimet 500 | | 18 | 17 | 4 | 3 | ... | 3 | .... | " |
| Udimet 700 | | 15 | 8.5 | 5 | 3.4 | ... | 4.5 | .... | " |

Each of these holes 106, 106a is pierce-formed by use of an indexed gang punch, platen type press.

The inner sheet 102 has a pattern of holes 108, 108a therein similarly dimensioned to the hole pattern defined by the holes 106 in the outer sheet 104. However, the holes 106, 106a are offset with respect to the holes 108, 108a for reasons to be discussed. Similarly, the holes 108, 108a are formed by a piercing operation like that to form the holes 106, 106a in the outer sheet 104.

Duplication of the aforesaid hole pattern also can be obtained by methods such as electron beam or laser beam piercing methods although the mechanical piercing arrangement is a preferred economical mode of forming the "holes only" sheets in the porous laminated liner 100 of the present invention.

In accordance with the present invention, the inner and outer sheets 102, 104 are located on either side of a pressed metal waffle patterned core sheet 110 that has an initial undeformed thickness in the order of 0.010 inches (0.254 mm). In the illustrated arrangement, the core sheet 110 is press formed on a platen type press to have a waffle pattern 112 therein which includes a plurality of offset depressions 114 and 116 on opposite faces of the core sheet 110 and further including a plurality of spaced raised dimples 118, 120 on opposite faces of the core sheet 110. The raised dimples 118, 120 include land segments 122, 124, respectively, thereon that are bonded by a layer 126, 128, respectively, of a suitable braze material that can be selectively applied to the land segments 122, 124. In one working embodiment the material is a molten phase bond braze accelerator which has a melting temperature below that of the melting temperature of the inner and outer sheets 102, 104 and the core sheet 110 so that it will become molten and diffuse into the contactng juxtaposed surfaces 130, 132 that are formed on the inboard face of each of the inner and outer sheets 102, 104.

The core sheet is press formed into the waffle pattern 112 and thereby has a total mass that corresponds to the original mass of the stock prior to pressing with the mass of material in the shaped waffle pattern 112 being displaced from the core sheet in its flat state so that the overall resistance of the liner 100 to thermal oxidation will be maintained. A further additional feature of the illustrated arraangement is that the only reduction in the mass is in the form of drilled cross passages 134 that are By virtue of the aforesaid arrangement, cooling air will flow through the pierced holes 106, 106a in the outer sheet 104 aligned with a plurality of depressions 114 formed in the core sheet 110 between certain areas of the raised dimples 118 of the waffle pattern 112. From the depressions 114 air will flow through the cross passages 134 into a like plurality of depressions 116 formed in the opposite face of the core sheet 110 between the raised dimples 120 thereof. Each of the depressions 116 will communicate with an adjacent one of the depressions 116 around the perimeter of the raised dimples 120 on the inboard face of the core sheet 110. Certain ones of the depressions 116 are also aligned with the pierced holes 108, 108a in the inner sheet 102 of material to serve as an exit for flow of coolant into the inside of the combustor apparatus to protect the liner 100 during the high temperature flame front operation that exists therein during gas turbine engine operation.

While the embodiments of the present invention, as herein disclosed, constitute a preferred form, it is to be understood that other forms might be adopted.

The embodiments of the invention in which an exclusive property or privilege is claimed are defined as follows:

1. A porous laminated wall comprising: an inner sheet and an outer sheet, a first plurality of mechanically formed holes in said inner sheet and a second plurality of mechanically formed holes formed in said outer sheet, said first and second plurality of holes being offset from each other throughout the full extent of said wall segment, and a mechanically press-formed core sheet interposed between said inner and outer sheets having offset depressions formed on either face thereof and raised segments forming flat spaced land surfaces, means for bonding said land surfaces to said inner and outer sheets, respectively, to define a bond joint therebetween, drill holes formed in said core sheet having a width less than that of said offset depressions and having the margins thereof located at spaced relationship to the land surfaces thereby to prevent burr formation thereon from interfering with the interconnection defined by the bond joint between the corrugated core sheet and said inner and outer sheets, said core sheet having a total metal mass equivalent to the original metal mass by displacement of metal to form the depressions and lands therein except for the metal removed by formation of the small drill holes therethrough, said small drill holes communicating the offset depressions on opposite sides of said core sheet to form a tortuous intercommunicating flow path through said core sheet to offset ones of said mechanically formed holes in said inner and outer sheets for flow of coolant through the laminated sheets of said wall segment.

2. A gas turbine engine combustor having a porous laminated liner comprising: an inner sheet and and outer sheet, a first plurality of outlet holes in said inner sheet and a second plurality of inlet holes formed in said outer sheet, said first and second plurality of outlet holes being offset from said inlet holes throughout the full extent of said liner, and a mechanically press formed waffle patterned core sheet interposed between said inner and outer sheets having offset depressions formed on either face thereof and dimples forming spaced lands, means for bonding said lands to said inner and outer sheets, respectively, to define a bond joint therebetween, cross passages with edge formations formed in said core sheet having the margins thereof located in spaced relationship tó the lands thereby to prevent said edge formations from interfering with the interconnection defined by the bond joint between the waffle patterned core sheet and said inner and outer sheets, said core sheet having a total metal mass equivalent to the original metal mass by displacement of metal to form the depressions and lands therein except for the metal removed by formation of the cross passages therethrough, said cross passages communicating the offset depressions on opposite sides of said core sheet to form a tortuous intercommunicating flow path through said core sheet to offset ones of said mechanically formed holes in said inner and outer sheets for flow of coolant through the laminated sheets of said liner.

3. A gas turbine engine combustor having a porous laminated liner comprising: an inner sheet and an outer sheet, a first plurality of mechanically formed outlet holes in said inner sheet and a second plurality of mechanically formed inlet holes formed in said outer sheet, said first plurality of outlet holes being offset from said inlet holes throughout the full extent of said liner, and a mechanically press formed waffle patterned core sheet interposed between said inner and outer sheets having offset depressions formed on either face thereof and dimples forming flat spaced land surfaces, means for bonding said land surfaces to said inner and outer sheets, respectively, to define a bond joint therebetween, holes drill formed in said core sheet having a width less than that of said offset depressionns and having the margins thereof located in spaced relationship to the land surfaces thereby to prevent burr formation thereon from interfering with the interconnection defined by the bond joint between the waffle patterned core sheet and said inner and outer sheets, said core sheet having a total metal mass equivalent to the original metal pass by displacement of metal to form the depressions and lands therein except for the metal removed by formation of the drill holes therethrough, said drill holes communicating the offset depressions on opposite sides of said core sheet to form a tortuous intercommunicating flow path through said core sheet to offset ones of said mechanically formed holes in said inner and outer sheets for flow of coolant through the laminated sheets of said liner.

* * * * *